Jan. 1, 1963    V. A. SEMPLER    3,070,918
COMPARTMENTED TROLLING REEL
Filed Jan. 5, 1961    2 Sheets-Sheet 1
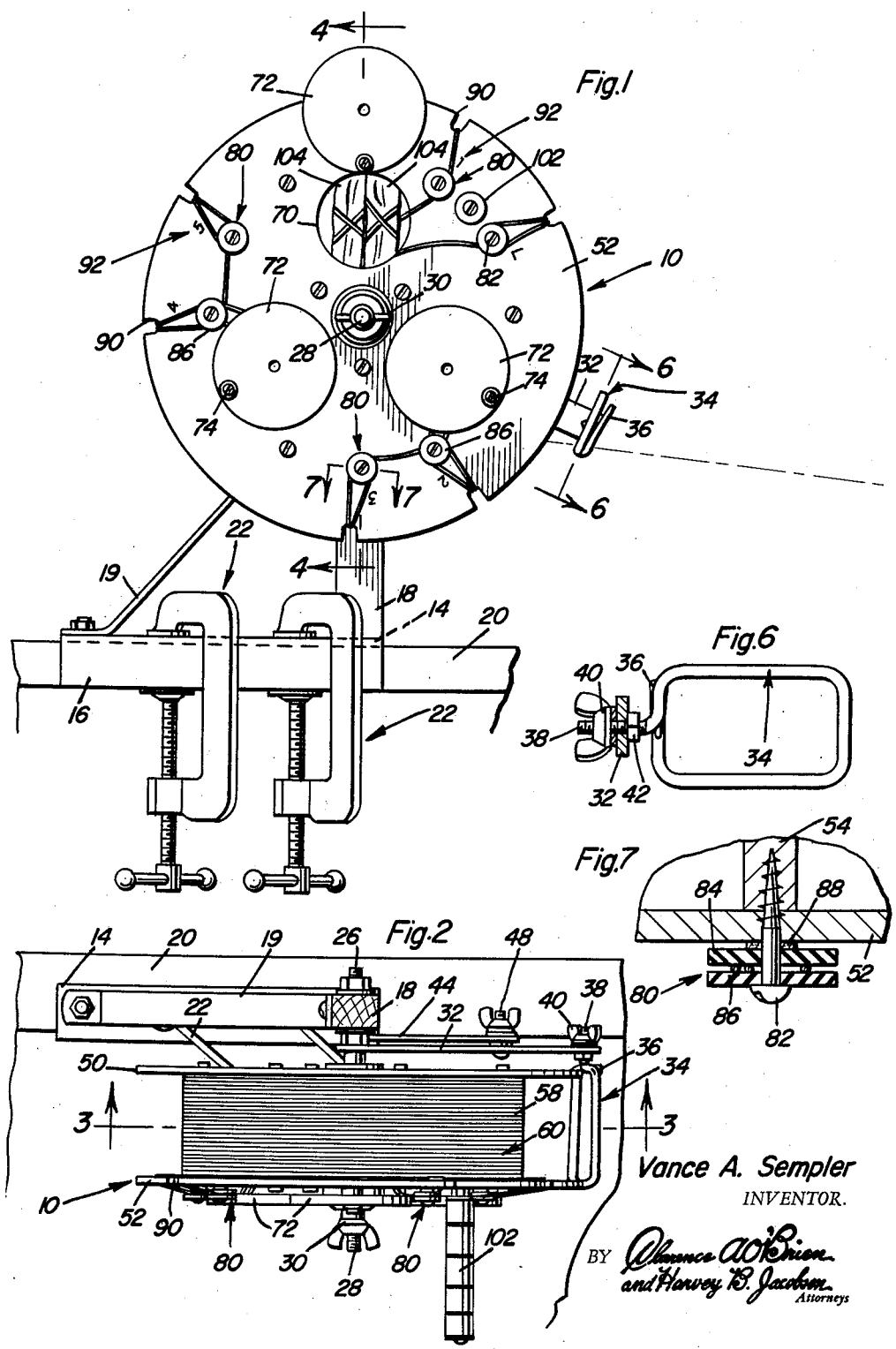
Vance A. Sempler
INVENTOR.

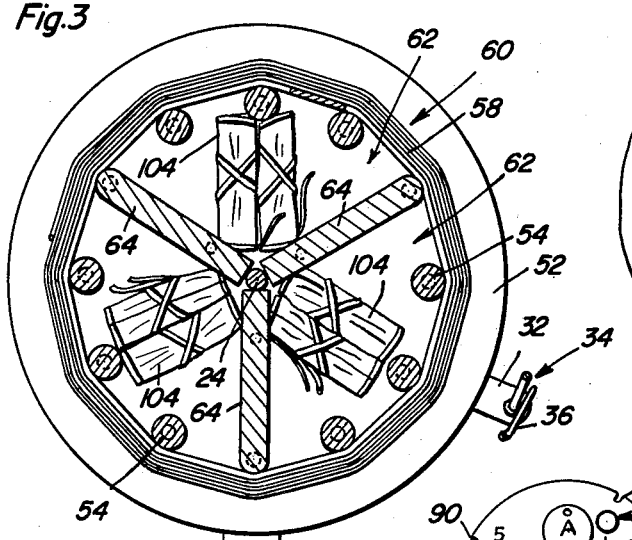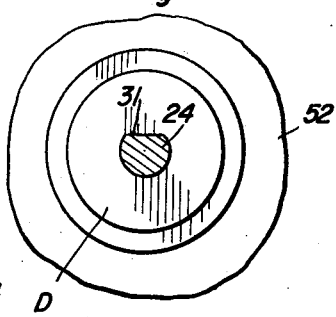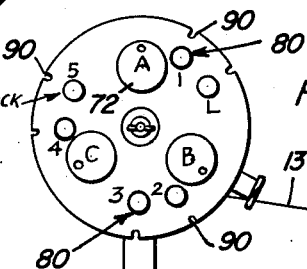

United States Patent Office
3,070,918
Patented Jan. 1, 1963

3,070,918
COMPARTMENTED TROLLING REEL
Vance A. Sempler, Elmira, N.Y., assignor of one-half to Richard V. Sempler, Millport, N.Y.
Filed Jan. 5, 1961, Ser. No. 80,791
3 Claims. (Cl. 43—54.5)

This invention relates to an improved trolling reel which is such in construction that it enables the user to employ a trolling line or rig with as many leaders as may be needed and without having to contend with exasperating and time consuming line tangling difficulties.

Briefly, the inventtion comprises a novel reel structure embodying a structurally unique spool or reel mounted for rotation on a simple but highly practical stand. The stand comprises a base provided with a standard or upright carrying a shaft. The base may be mounted on a boat and held by readily applicable and removable clamps. The line reeling and storing spool or reel is mounted for rotation on the shaft and provided with improved facilities.

One improvement has to do with several, more or less, pocket-like storage compartments incorporated in the spool or reel between the opposed spaced heads thereof. These compartments are preferably V-shaped and each compartment has an access opening provided with a pivoted closure or door which may be swung to an out-of-the-way position to allow the lines to be either placed in or removed from a selected compartment. Each compartment serves to hold two lure and hook-equipped leaders each of which is suitably wrapped and protected with a soft canvas wrapper. Most rigs are provided with three to five leaders; so, several usable compartments are used in the instant invention.

The improved spool or reel also is provided with two line locks or fasteners adjacent to each door. Each fastener, usually a pair of simple rubber washers, holds the lines securely when the wrapped leaders or lures are stored in their intended compartments. The head of the spool carrying the fasteners is preferably numbered (1 to 5) for systematic and orderly use.

Further improvement resides in providing line seating or keeper notches in the outer head whereby the line portions are kept in an orderly manner.

Another improvement resides in providing a wire or screen-type web between the spaced heads. This web surrounds dowels or rounds supported between the heads and provides an aerating or ventilating rim on which the line may be wound and promotes air circulation for quick line drying needs.

An added improvement has to do with the provision of a bracket arm pivoted on the reel or spool shaft. A line guide is adjustably mounted on the projecting outer end of the arm and correctly lined up for expeditious line handling requirements.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in side elevation of a compartmented trolling reel structure constructed in accordance with the invention and showing the manner in which it is constructed and used.

FIG. 2 is a top plan view of the construction shown in FIG. 1.

FIG. 3 is a section on the line 3—3 of FIG. 2.

FIG. 4 is an enlarged section on the vertical line 4—4 of FIG. 1.

FIG. 5 is an enlarged section on the line 5—5 of FIG. 4.

FIGS. 6 and 7 are enlarged sections on the lines 6—6 and 7—7, respectively, of FIG. 1.

FIG. 8 is a view in side elevation on a small scale and diagrammatically presented showing the trolling line in use and in relation to the reel.

FIG. 9 is a view in side elevation on a small scale showing the construction of the stand.

With reference first to FIG. 9 the line reeling and storing spool or reel, as an entity, is denoted by the numeral 10 and the stand by the numeral 12. The stand (FIGS. 1, 2 and 9) comprises a suitable base plate 14 having a depending flange 16. Attached to and rising from the base plate is an appropriate standard or upright 18 rigidified by a suitable brace 19. For compactness and convenience the lower end of the upright is fixed to one end of the base plate 14. Also the lower end of the brace is joined to the other end of the base plate, the upper end of said brace being fixed to an upper median portion of the upright 18. In practice the base is mounted on a boat or similar relatively stationary support 20 (FIG. 1) and is held in place by appropriate C-clamps or the like 22. As shown in FIG. 4 the reel shaft 24 has a screw threaded end portion 26 fastened to the upper part of the upright or standard by nuts and washers. The left hand end 28 of the shaft is screw threaded to accommodate an assembling nut 30. An end portion of the shaft is flattened as at 31 (FIG. 5) for a purpose to be described. Referring again to FIG. 9 the numeral 32 designates a bracket arm provided with an extending end which projects beyond the periphery of the reel or spool 10 and is provided with a line guide eye 34. With reference to FIG. 6 it will be seen that this guide is of elongated loop-like form and may be described as a split frame. It is formed from rod stock and one free end 36 provides an entrance and exit for the line. The other laterally bent end is screw threaded at 38 and provided with inner and outer nuts 40 and 42 serving to mount the guide adjustably and removably on the bracket arm. As shown in FIG. 9 the numeral 44 designates a diagonal stay one end of which is pivotally mounted on a bolt or the like 46 (FIG. 4), the other end 48 being adjustably joined to the brace arm 32.

The novel reel 10 (specifically referred to as a spool) comprises an inner plate or head 50 and a spaced parallel outer head 52. Circumferentially spaced dowel pins or rounds 54 are interposed between the heads and are suitably screwed or otherwise fastened in place as at 56. These dowels not only are component parts of the head structure, they also serve to accommodate copper wires or screen material 58 wrapped around the same to form a web which in turn constitutes a rim 60 on which the line may be wound. With reference to FIG. 8 the trolling line is denoted at 11 and comprises the main line 13 and five auxiliary drop lines or leaders 15 with fishhooks 17 or otherwise provided with lures having hooks attached thereto.

A significant phase of the invention has to do with the circumferentially spaced substantially V-shaped compartments or pockets 62 (FIG. 3). These pockets are defined by circumferentially spaced partitions or dividers 64 having inner ends converging toward the shaft and outer ends terminating inwardly of the rim 60. The rim serves to close the outer mouth portions of the pockets. These partitions or dividers are screwed or otherwise fastened and held in place between the interior surfaces of the heads as at 68 (FIG. 4). To the left in FIG. 4 each pocket-like compartment is provided at one side with a relatively large circular entrance and exit hole or opening 70 which is provided with a lid-like closure or door 72. This door 72 is rotatably mounted on a headed fastener 74, a suitable screw, surrounded by a spacing washer 76 and a spring washer 78. Cooperable with each door are paired line locks or fasteners 80 each of the specific construction shown in FIG. 7. As here illustrated a headed fastener 82 is provided with an inner rubber or flexibly resilient washer 84 and an outer washer 86 and a leather washer or the like 88 is interposed between the washer 84 and the head 52. Then, too, it will be seen in FIG. 1 that the outer marginal edge of the spool head 52 is provided with circumferentially spaced line seating or keeper notches 90. In practice these notches may be systematically designated by numerals 92 (the numbers are here designated 1–L–2–3–4–5 from right to left or clockwise in FIG. 1).

As shown in FIG. 4 spacers 94 are interposed between the upright and the head 50 of the reel. On the other side of the reel there is a cup-like cap 96 cooperating with a nut 98 and coil spring 100. The nut 30 and spacer 33 (to the left of the cap) serve to tension the spring and force the reel over against the end thrust spacing washers or equivalent elements 94. The numeral 102 (FIG. 2) designates a suitable reel operating handle. The numeral 104 designates a canvas wrapper which is placed around a leader in the manner shown in dotted lines in FIG. 4.

As shown the reel is provided with three compartments 62 each compartment having its own door 72 that swings out of the way allowing the leader to be either taken out or put in the compartment. Each compartment will hold two lures easily. Each lure is wrapped in soft canvas to portect the finish of lures and to prevent tangles in the compartment. The aforementioned line locks 80 are mounted adjacent to each cooperating door and there are two sets of line locks. The washers 84 and 86 are made out of rubber to hold the lines tight when lures are in the compartments. The indications or numbers 1–L–2–3–4–5 designate which leader is to come in at that position and this provides for orderly arrangement of the rig on the reel.

The aforementioned line accommodating and seating notches 90 are so arranged that the lines are kept in an orderly manner on the reel. The spacing line B also comes in the notch around the line lock and back out onto the reel. By doing this each time a lure is put into a compartment the lines are positioned automatically so that when the rig is run out the spacer line will automatically stop the reel at the proper position so that the lure can be taken from the compartment and run out.

It will have been noted that the line locks 80 are such in construction that the inner washer 84 yields toward the head of the spool or reel and in fact bends by reason of the associated smaller leather washer 88. The other washer 86 flexes outwardly and a tight line retention action is assured.

In practice each compartment door pivots on a wood screw 74. The spring washer 78 in conjunction with the spacing washer 76 and the screw action puts tension on the door so that it may be opened and closed easily yet retained frictionally in an open position. In actual practice it has been found that the reel heads and compartment doors may be made of tempered Masonite. Referring again to the rim or web made up of wires as at 60 in FIG. 4 it will be evident that this construction promotes free circulation of air and ventilates the compartments and effects drying of the parts in a desirable manner.

The line guide 34 is made of hardened steel. The line guide arm or bracket and line guide may also be made of metal such as steel. By providing a slot as at 36 in FIG. 6 the construction allows the lures to be released into the water easier by slipping the leader out through the slot in the line guide. Therefore the lure does not have to be worked through the line guide. With the construction shown in FIG. 9 the bracket arm and line guide may be swung from the left hand position to a right hand position by simply loosening the fastening means 48, then swinging the arm 32 over to the right and again attaching the stay 44 in an obvious manner.

The "brake control" gives the fisherman proper line tension at all times. It is of the utmost in simplicity and construction and works effectively and satisfactory. The D-shape washers riding on the mill cut on the shaft eliminates the friction that would normally be found at that point due to the spinning of the reel. The coil spring compressed by the wing nut gives any amount of tension that may be desired thereby controlling the movement of the reel.

It is believed that the diagrammatic views FIGS. 8 and 9 will assist in enabling the reader to obtain a clear and comprehensive understanding of the over-all subject matter and the significant aspects thereon. For example, it will be seen that the line locks are designated as 1–L–2–3–4–5. Also, the short leader 19 in FIG. 8 is provided with a lead or an equivalent sinker as designated. In presenting this disclosure it will simplify the understanding if the compartments are designated as seen in FIG. 8 with the reference letters A, that is compartment A, the associated line locks 1–L, B compartment at line locks 2–3, C compartment at line locks 4–5.

The brake control is operated by the brake control wing nut. Turn clockwise to apply tension. Turn counterclockwise to release tension. The brake controls the movement of the spool or reel at all times, from a very slight tension to locking the reel tightly.

The line guide was specially designated to allow the line to be put into the line guide or released from it simply by moving line to opening in line guide, and feeding line in or out.

Examine reel carefully at this time and notice how main line of rig is wound around line lock at each position except No. 1. This ararngement automatically stops the reel at the right time so that the lure can be taken from the compartment and released into the water at the proper time. Also note that the leader with lure on it (referred to as side leader) is always wound around line lock first then main leader is put around line lock.

The mode of use and operation is as follows: Open type door on compartment A remove lure that goes to line lock No. 1, remove canvas cloth 104, release leader from line lock, close door. Put lure through the line guide. Turn brake control wing nut until spool or reel turns free. Then, pay out the main line until the reel stops. Tighten the brake control wing nut. Open the door again on compartment A remove line (note this line has large snap swivel for lead). Put the lead on the snap swivel. Release main line, then side leader, at line lock L. Put line through line guide. Turn brake control wing nut so that reel will let the line run off slowly. The reel will automatically stop at B compartment No. 2 line lock. At this point in the operation of the reel reverse procedure and bring the lead and lure that are now in the water back out and back in place in the reel. When bringing in rig always turn reel until each lure in turn comes up to the line guide. Then reverse reel until proper compartment is directly opposite line guide. Wrap any excess line around leather washer that is back of line lock. After several practice runs as above the user is ready to release all lures in proper order and bring them in. When the rig is being put out always start at A compartment No. 1 line lock. When rig is being brought in, start at C compartment No. 5 line lock.

When bringing in rig, if the user forgets to wind the main leader 13 around the line lock as previously explained, the reel will not stop automatically at that particular line lock. Instead the reel will continue to turn until the 3 way swivel is reached. If this happens, tighten brake control wing nut so that reel cannot turn. Then check and see which lure was next to be released. Take lure from compartment, release leader from line lock and unwind by hand until 3 way swivel is reached.

When the above instructions are followed one may be sure that the ring will never foul or become tangled.

After the ring has been used a few times the monofilament line will stretch a little. Therefore, the drop lines or side leaders 15 will be a little longer than necessary. This excess line can be wrapped around the leather or equivalent washer in back of each line lock. These are points included in the operating instructions of the unique compartmental reel.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A trolling reel comprising a spool, means for rotatably supporting said spool, said spool comprising a pair of spaced parallel heads, namely, an inner head and an outer head, a plurality of radial divider plates interposed between and secured to said heads, said plates being circumferentially spaced with inner transverse ends converging and outer diverging transverse ends terminating inwardly and spaced from the outer marginal edges of said heads and defining individual pocket-like storing compartments, that portion of the spool radially outward of the outer transverse ends of said plates and between said heads having an encompassing web defining a line winding rim, said outer head having circumferentially spaced entrance and exit openings lined up with their respective compartments, each opening provided with a readily opening and closable cover, and a plurality of line locking fasteners mounted on the exterior surface of the outer head adjacent to and for predetermined cooperation with said openings, the outer marginal edge of said outer head being provided with circumferentially spaced notches opening outwardly through said outer edge, said notches being lined up with the line locking fasteners with which they cooperate, each line locking fastener comprising a pair of opposed elastic washers fastened together and mounted on said outer head and between which a portion of the line may be clampingly but releasably held.

2. The structure defined in claim 1, and wherein said rim comprises circumferentially spaced dowels supported between the heads, and wires wound around the dowels, the windings of wire being spaced so that atmospheric air may circulate freely for line drying needs.

3. For use in paying out, reeling in and storing a main fishing line having longitudinally spaced leaders thereon provided with hooks and sinkers, a trolling reel comprising a portable support having a shaft, a line handling spool mounted for rotation on said shaft, said shaft provided at an outer end with adjustable manually regulatable brake means acting on the hub portion of the spool for controlling the rotative action of the spool, said spool having radial circumferentially spaced storing pockets, a ventilated line winding rim outwardly of the pockets and providing closure means for the pockets, said spool having a head provided with circumferentially spaced openings aligned with the individual pockets, each opening having a manually openable and closable lid, said head provided with circumferentially spaced keeper notches, said head being further provided with accessible line locking fasteners, said fasteners being interrelated in respect to the keeper notches and pockets to facilitate orderly reeling in and paying out the trolling line, each locking fastener comprising a pair of opposed elastic washers aligned with each other and secured together and accessibly mounted in a manner to permit the cooperating portion of the line to be lodged and resiliently and frictionally held between the coacting washers.

References Cited in the file of this patent

UNITED STATES PATENTS

| | | |
|---|---|---|
| 250,216 | Dimock | Nov. 29, 1881 |
| 579,461 | Yeakel | Mar. 23, 1897 |
| 976,541 | Blevins et al. | Nov. 22, 1910 |
| 1,800,607 | Decker | Apr. 14, 1931 |
| 2,144,094 | Wood | Jan. 17, 1939 |
| 2,194,088 | Joabson | Mar. 19, 1940 |
| 2,333,632 | Benson | Nov. 9, 1943 |
| 2,536,931 | Harward | Jan. 2, 1951 |
| 2,647,341 | Donnell | Aug. 4, 1953 |
| 2,698,726 | Howe | Jan. 4, 1955 |

FOREIGN PATENTS

| | | |
|---|---|---|
| 463,492 | Germany | July 30, 1928 |